United States Patent
Hengeveld (10) Patent No.: US 9,300,570 B2
(45) Date of Patent: Mar. 29, 2016

(54) MULTI-TUNNEL VIRTUAL PRIVATE NETWORK

(75) Inventor: Thomas A. Hengeveld, Hollis, NH (US)

(73) Assignee: Harris Corporation, Melbourne, FL (US)

( * ) Notice: Subject to any disclaimer, the term of this patent is extended or adjusted under 35 U.S.C. 154(b) by 444 days.

(21) Appl. No.: 13/477,185

(22) Filed: May 22, 2012

(65) Prior Publication Data
US 2013/0318345 A1  Nov. 28, 2013

(51) Int. Cl.
| | | |
|---|---|---|
| G06F 21/00 | (2013.01) | |
| H04L 12/707 | (2013.01) | |
| H04L 12/725 | (2013.01) | |
| H04L 12/851 | (2013.01) | |
| H04L 12/46 | (2006.01) | |

(52) U.S. Cl.
CPC ............ *H04L 45/22* (2013.01); *H04L 12/4633* (2013.01); *H04L 45/302* (2013.01); *H04L 47/24* (2013.01)

(58) Field of Classification Search
None
See application file for complete search history.

(56) References Cited

U.S. PATENT DOCUMENTS

| | | | | | |
|---|---|---|---|---|---|
| 6,493,349 | B1 * | 12/2002 | Casey | ................. | H04L 12/4675 370/409 |
| 6,526,056 | B1 * | 2/2003 | Rekhter | ............. | H04L 12/4645 370/392 |
| 6,590,885 | B1 * | 7/2003 | Jorgensen | ................. | H04L 1/20 370/328 |
| 6,606,663 | B1 * | 8/2003 | Liao | ....................... | G06Q 20/20 705/25 |
| 6,614,775 | B1 * | 9/2003 | Chang | .................. | H04B 7/2603 370/329 |
| 6,675,225 | B1 * | 1/2004 | Genty | ................. | H04L 12/4641 709/239 |
| 6,912,232 | B1 * | 6/2005 | Duffield | ............. | H04L 12/4641 370/231 |
| 6,993,026 | B1 * | 1/2006 | Baum | ................. | H04L 12/4633 370/392 |
| 7,072,346 | B2 * | 7/2006 | Hama | ................. | H04L 12/4641 370/389 |
| 7,076,569 | B1 * | 7/2006 | Bailey | ..................... | H04L 69/12 709/212 |

(Continued)

FOREIGN PATENT DOCUMENTS

| | | |
|---|---|---|
| EP | 1816789 | 8/2007 |
| WO | 2009/149732 | 12/2009 |

OTHER PUBLICATIONS

William Stallings "Network Security Essentials, Applications and Standards", ISBN 0130160938, 2000.*

(Continued)

*Primary Examiner* — Peter Poltorak
(74) *Attorney, Agent, or Firm* — Fox Rothschild, LLP; Robert J. Sacco; Carol E. Thorstad-Forsyth (57) ABSTRACT

Systems and methods for controlling Quality-of-Service ("QoS") in a Virtual Private Network ("VPN") in a transport network providing a plurality of QoS bearers. The methods involve: establishing, between two VPN endpoints, a plurality of VPN tunnels through the transport network, including at least a default VPN tunnel associated with a first QoS bearer and an alternate VPN tunnel associated with a second QoS bearer; receiving and analyzing a data block; applying a VPN policy to assign the data block to either default VPN tunnel or alternate VPN tunnel; and encapsulating the data block in a transport data block including at least one indicator. The indicator specifies whether the transport data block is to be communicated by the transport network using the first QoS bearer or second QoS bearer.

18 Claims, 8 Drawing Sheets

(56) References Cited

U.S. PATENT DOCUMENTS

| | | | |
|---|---|---|---|
| 7,225,259 B2* | 5/2007 | Ho | H04L 12/4633 370/230 |
| 7,440,407 B2* | 10/2008 | Roy | H04L 12/4641 370/241 |
| 7,478,427 B2* | 1/2009 | Mukherjee | H04L 12/4633 709/228 |
| 7,649,848 B1 | 1/2010 | Swan et al. | |
| 7,673,048 B1* | 3/2010 | O'Toole, Jr. | H04L 12/4633 370/229 |
| 7,693,056 B2* | 4/2010 | Heissenbuttel | H04L 12/4641 370/230 |
| 7,730,172 B1* | 6/2010 | Lewis | G06Q 10/04 709/223 |
| 7,801,030 B1* | 9/2010 | Aggarwal | H04L 12/44 370/227 |
| 7,805,602 B1* | 9/2010 | Karpati | H04L 12/4633 713/150 |
| 7,835,275 B1* | 11/2010 | Swan | H04L 12/4633 370/229 |
| 8,132,247 B2* | 3/2012 | Adhya et al. | 726/11 |
| 8,146,148 B2* | 3/2012 | Cheriton | 726/15 |
| 8,260,922 B1* | 9/2012 | Aggarwal | H04L 45/24 709/226 |
| 8,498,300 B2* | 7/2013 | Kwon | H04L 41/5041 370/400 |
| 8,553,541 B2* | 10/2013 | Mihaly | H04L 12/5692 370/230 |
| 2001/0016914 A1* | 8/2001 | Tabata | H04L 63/0272 726/15 |
| 2002/0023159 A1* | 2/2002 | Vange | G06F 9/5027 709/228 |
| 2002/0024964 A1* | 2/2002 | Baum | H04L 12/4633 370/419 |
| 2002/0026531 A1* | 2/2002 | Keane | H04L 12/2602 709/250 |
| 2002/0042875 A1 | 4/2002 | Shukla | |
| 2002/0101820 A1* | 8/2002 | Gupta | H04L 12/2801 370/229 |
| 2002/0150041 A1* | 10/2002 | Reinshmidt | H04L 12/2697 370/216 |
| 2003/0103510 A1* | 6/2003 | Svanberg | H04L 12/4633 370/395.2 |
| 2003/0117954 A1* | 6/2003 | De Neve | H04L 12/4641 370/230 |
| 2003/0172264 A1* | 9/2003 | Dillon | H04L 12/4633 713/160 |
| 2003/0177221 A1* | 9/2003 | Ould-Brahim | H04L 12/4641 709/223 |
| 2004/0017781 A1* | 1/2004 | Alferness | H04L 12/5693 370/252 |
| 2004/0022191 A1* | 2/2004 | Bernet et al. | 370/230 |
| 2004/0083295 A1* | 4/2004 | Amara | H04L 12/4645 709/229 |
| 2005/0015511 A1* | 1/2005 | Izmailov | H04L 12/18 709/238 |
| 2005/0058132 A1* | 3/2005 | Okano | H04L 12/4666 370/389 |
| 2005/0088977 A1* | 4/2005 | Roch | H04L 12/4641 370/254 |
| 2005/0144282 A1* | 6/2005 | Argo | H04L 41/0896 709/226 |
| 2006/0268905 A1* | 11/2006 | Su | H04L 45/302 370/401 |
| 2007/0038751 A1* | 2/2007 | Jorgensen | H04L 1/20 709/226 |
| 2007/0165530 A1* | 7/2007 | Dong | H04L 12/4645 370/235 |
| 2007/0242667 A1* | 10/2007 | Liu | H04L 45/04 370/389 |
| 2007/0253427 A1* | 11/2007 | Stirbu | H04L 12/5695 370/395.21 |
| 2008/0072301 A1* | 3/2008 | Chia | H04L 63/0815 726/8 |
| 2008/0075016 A1* | 3/2008 | Ashwood-Smith | H04L 45/02 370/252 |
| 2008/0144615 A1* | 6/2008 | Casey | H04L 29/125 370/389 |
| 2008/0172732 A1* | 7/2008 | Li | H04L 12/4641 726/15 |
| 2009/0225762 A1* | 9/2009 | Davidson | H04L 12/4675 370/401 |
| 2010/0142410 A1* | 6/2010 | Huynh Van | H04L 12/4633 370/255 |
| 2010/0281190 A1 | 11/2010 | Namihira | |
| 2010/0284409 A1* | 11/2010 | Lv | H04L 12/4675 370/395.31 |
| 2011/0035796 A1 | 2/2011 | Khalid et al. | |
| 2011/0110225 A1* | 5/2011 | Mihaly | H04L 12/5692 370/225 |
| 2012/0092992 A1* | 4/2012 | Pappas | H04L 47/2491 370/235 |
| 2013/0121262 A1* | 5/2013 | Sadiq | H04W 76/022 370/329 |

OTHER PUBLICATIONS

Volker et al. Introducing QoS mechanisms into IPsec packet processing, IEEE 0742-1303/07, 07.*

Williams, "Alcatel-Lucent unveils application-aware VPN, itnews for australian business", May 2009, found at www.itnews.com/au/tools/print.aspx?ciid=144958.*

Mostafa et al, "Q-ESP: a QoS-compliant Security Protocol to enrich IPSec Framework", IEEE/IFIP Internaional Conferenc on New Technologies, Mobility and Security, 2009.*

Ekström, H., "QoS Control in the 3GPP Evolved Packet System," IEEE Communications Magazine, Feb. 2009, pp. 76-83.

International Preliminary Report on the Patentability mailed Dec. 4, 2014 Application Serial No. PCT/US2013/041579 in the name of Harris Corporation.

* cited by examiner

MULTI-TUNNEL VIRTUAL PRIVATE NETWORK

STATEMENT OF THE TECHNICAL FIELD

The invention concerns virtual private networks. More particularly, the invention concerns providing quality-of-service features in a virtual private network.

DESCRIPTION OF THE RELATED ART

A Virtual Private Network ("VPN") can be used to provide secure communications between a private network and a remote user device, via a non-trusted (e.g., public) transport network such as the internet. Secure VPNs employ cryptographic tunneling protocols to secure data traffic between VPN endpoints, generally by encrypting application data and encapsulating the resulting encrypted VPN payload in a transport packet prior to transmission via the non-trusted network.

Network-based applications have varying needs for service quality. For example, real-time bidirectional communications applications such as video conferencing require low latency to provide a good user experience, whereas other application types such as file-sharing are generally able to provide a good user experience despite a relatively high level of latency. Some transport network technologies, such as 3GPP LTE, allow transport network providers to offer higher service levels to particular customers, e.g., for a fee.

The term "Quality-of-Service" ("QoS") is used herein to refer to a variety of related features for use in communications systems, such as prioritization, and/or service level guarantees, as non-limiting examples. A transport network generally provides different QoS levels by providing multiple QoS bearers. A QoS bearer is a mechanism provided by a transport network for transporting data at a specified QoS level, as is known in the art. Data can be assigned to QoS bearers according to a set of rules known as a QoS policy. A QoS policy can define service levels based on criteria including application type, user, and/or other data properties. QoS features can be used to provide different levels of service with respect to latency, bandwidth, dropped packets, and/or other network qualities.

Packet inspection can be used at various points in a packet-based network to determine properties of a data packet such as application type, protocol, source address, source port number, destination address, and/or destination port number. A QoS policy is often applied based on properties determined by packet inspection.

SUMMARY OF THE INVENTION

Embodiments of the present invention concern methods for controlling Quality-of-Service ("QoS") in a Virtual Private Network ("VPN") in a transport network providing a plurality of QoS bearers. The methods generally involve establishing, between a first VPN endpoint and a second VPN endpoint, a plurality of VPN tunnels through a transport network. The plurality of VPN tunnels includes at least a default VPN tunnel associated with a first QoS bearer and an alternate VPN tunnel associated with a second QoS bearer. The methods also involve performing the following steps at the first VPN endpoint: receiving a first data block comprising application data; analyzing the first data block to determine at least one characteristic thereof; applying a VPN policy to the first data block based on the analyzing; selectively assigning the first data block to one of the default VPN tunnel and the alternate VPN tunnel based on the applying step; and encapsulating the first data block in a transport data block. The transport data block includes at least one indicator which specifies whether the transport data block is to be communicated by the transport network using the first QoS bearer or the second QoS bearer. The indicator is determined in accordance with the assigning step.

Embodiments of the present invention also concern systems implementing the above described method embodiments. The system embodiments comprise at least one electronic circuit configured to establish, between a first VPN endpoint and a second VPN endpoint, a plurality of VPN tunnels through a transport network. The plurality of VPN tunnels includes at least a default VPN tunnel associated with a first QoS bearer and an alternate VPN tunnel associated with a second QoS bearer. The at least one electronic circuit is also configured to: receive a first data block comprising application data; analyze the first data block to determine at least one characteristic thereof; apply a VPN policy to the first data block based on the analysis; selectively assign the first data block to one of the default VPN tunnel and the alternate VPN tunnel based on the application of the VPN policy; and encapsulate the first data block in a transport data block. The transport data block includes at least one indicator which specifies whether the transport data block is to be communicated by the transport network using the first QoS bearer or the second QoS bearer. The indicator is determined in accordance with the assignment.

BRIEF DESCRIPTION OF THE DRAWINGS

Exemplary embodiments will be described with reference to the following drawing figures, in which like numerals represent like items throughout the figures, and in which.

DETAILED DESCRIPTION

The present invention is described with reference to the attached figures. The figures are not drawn to scale and they are provided merely to illustrate exemplary embodiments of the present invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present invention concerns providing different Quality of Service ("QoS") levels within a Virtual Private Network ("VPN") operating on a transport network that offers multiple QoS levels. Encryption conventionally performed by VPN endpoints, such as a VPN client and a VPN server, prevents meaningful inspection of application messages by a transport network. The inability to inspect application messages defeats conventional attempts by the transport network to provide different levels of service based on properties of the message. Exemplary embodiments of the present invention overcome such limitations by establishing a plurality of VPN tunnels through a transport network between two VPN endpoints. The transport network provides a plurality of QoS bearers, and each of the plurality of VPN tunnels is associated with a QoS bearer. VPN policies are applied in the VPN endpoints, rather than in a gateway associated with the transport network. Application of the VPN policies in the VPN endpoints allows VPN policies to be applied before the data is encrypted. The VPN policies dictate the assignment of application messages to VPN tunnels and associated QoS bearers. An indicator is added to the data as part of the VPN encapsulation process to identify the VPN tunnel and QoS bearer to which the data has been assigned. For example, traffic from each of a plurality of software applications running in a Remote Network Host can be assigned to a different VPN tunnel and associated QoS bearer for transmission through the transport network to a VPN server. Likewise, traffic from each of a plurality of application servers in a private network can be assigned to a different VPN tunnel and associated QoS bearer for transmission through the transport network to a VPN client. Thus, exemplary embodiments of the present invention provide QoS features to traffic within a VPN.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Figure 1:
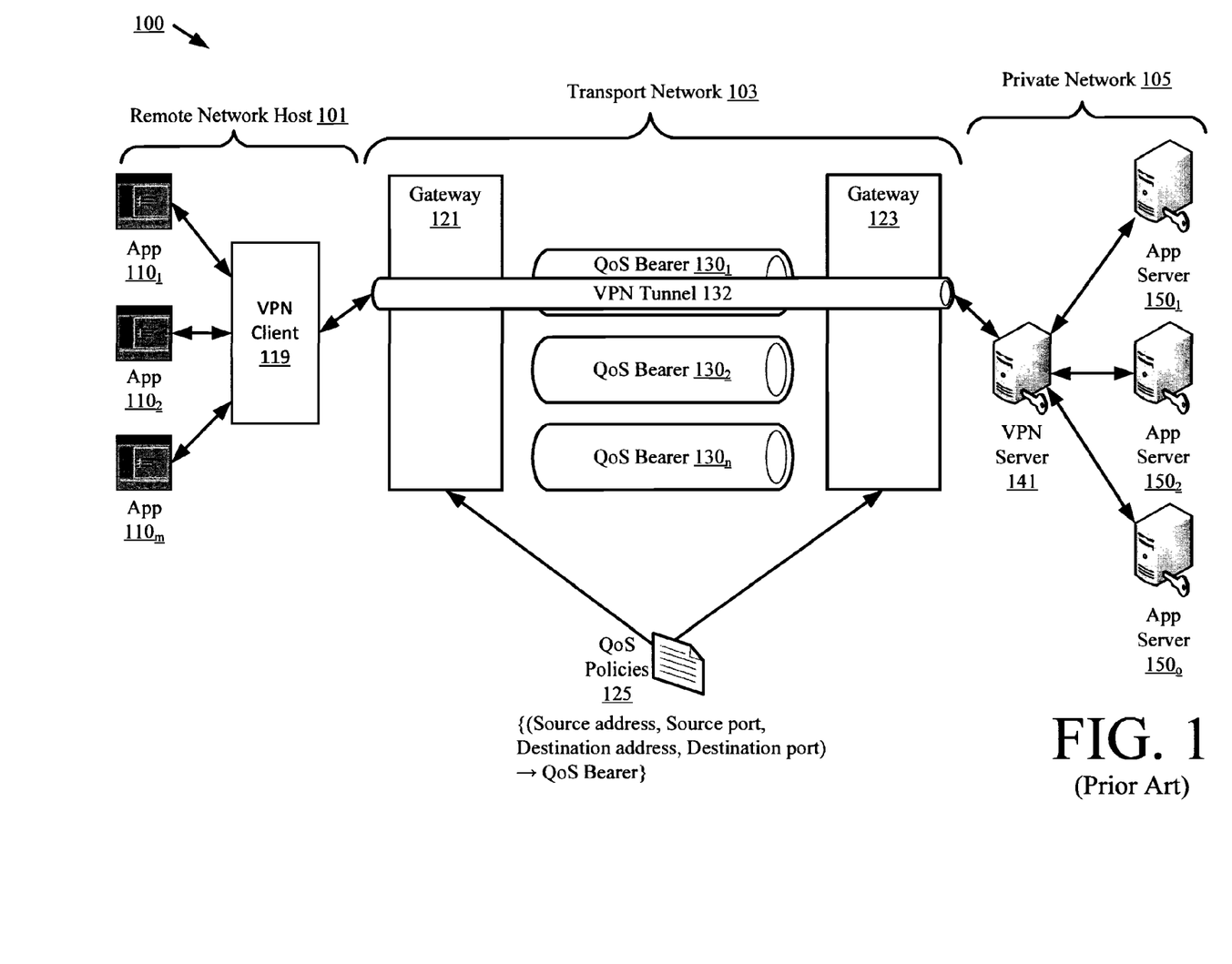
FIG. 1 is a schematic illustration of an exemplary prior art system that is useful for understanding the present invention.

Referring now to FIG. 1, there is provided a schematic illustration of an exemplary prior art system 100 that includes a Remote Network Host 101, transport network 103, and private network 105. Remote Network Host 101 communicates securely with private network 105 via transport network 103 using conventional VPN technology to encrypt and encapsulate application messages. The VPN encryption prevents transport network 103 from performing a meaningful inspection of application messages. Thus, transport network 103 assigns all VPN traffic to a single, default QoS level as described in detail below.

Remote Network Host 101 comprises a processor (not shown) which executes a plurality of software application programs $110_1, 110_2, \ldots 110_m$, and VPN client 119. Remote Network Host 101 communicates with private network 105 via VPN tunnel 132, which provides secure communication between VPN client 119 and VPN server 141 through transport network 103. Application data is encrypted and encapsulated, by VPN client 119 and/or VPN server 141, in a transport data block prior to transmission, in either direction, via VPN tunnel 132. The VPN is generally transparent to software applications $110_1, 110_2, \ldots 110_m$ and application servers $150_1, 150_2, \ldots 150_o$. VPN tunnel 132 can be implemented using well-known cryptographic protocols such as Transport Layer Security ("TLS") and/or Secure Sockets Layer ("SSL"), as non-limiting examples.

VPN client 119 can receive out-bound application data bound for VPN server 141 from software applications $110_1, 110_2, \ldots 110_m$. Upon receipt of out-bound application data, VPN client 119 encrypts the application data to form a VPN payload, encapsulates the VPN payload in a transport data block or "transport packet", and provides the transport packet to transport network 103. VPN client 119 also receives in-bound transport data blocks from transport network 103, decrypts the VPN payload contained therein, and provides decrypted application data to the appropriate software application $110_1, 110_2, \ldots 110_m$.

VPN server 141 performs similar operations when sending data to VPN client 119 via VPN tunnel 132. VPN server 141 communicates with a plurality of application servers $150_1, 150_2 \ldots 150_o$ via private network 105. VPN server 141 receives out-bound application data from application servers $150_1, 150_2, \ldots 150_o$ bound for VPN client 119, encrypts the application data to form a VPN payload, encapsulates the VPN payload in a transport packet, and provides the transport packet to transport network 103 for transmission to VPN client 119.

A transport network 103 can provide a plurality of QoS bearers $130_1, 130_2, \ldots 130_n$, each providing a different QoS level. Transport network 103 can include, but is not limited to, a 3GPP Long Term Evolution (LTE) network. Transport network 103 can enable communication using protocols such as the well known Internet Protocol ("IP"), User Datagram Protocol ("UDP") and/or Transmission Control Protocol ("TCP"), as non-limiting examples. Transport network 103 also comprises client-side gateway 121 and server-side gateway 123. Each of the gateways 121 and 123 applies QoS policies 125 to assign data traffic to QoS bearers $130_1, 130_2, \ldots 130_n$. Upon receiving a transport packet, transport network 103 performs packet inspection and/or analysis to determine characteristics of the transport packet, such as transport protocol, source address, source port, destination address, and/or destination port, as non-limiting examples. Transport network 103 then applies QoS policies 125, based on the determined characteristics, to assign the transport packet to a particular QoS bearer $130_1, 130_2, \ldots 130_n$, and transmits the transport packet according to the service level defined by the assigned QoS bearer. These processes can be performed, for example, in gateway 121 and/or gateway 123. Gateway 121 and gateway 123 can be implemented as modems, routers, switches, servers, or any other appropriate network equipment as is known in the art. For example, client-side gateway 121 can be implemented as a modem associated with Remote Network Host 101, and server-side gateway 123 can be implemented as a router associated with VPN server 141.

The foregoing QoS operation of transport network 103 works well for non-VPN data traffic. However, transport network 103 is generally unable to decrypt a VPN payload, and therefore is unable to determine characteristics of the application data (in the VPN payload). Thus, packet inspection and/or analysis performed on the transport packet will generally be limited to analysis of the transport packet headers. Transport packets in VPN tunnel 132 will generally all have the same data in the transport packet headers (e.g., source address, source port, destination address, and/or destination port), regardless of the software application $110_1$, $110_2$, ... $110_m$ or application server $150_1$, $150_2$, ... $150_o$ involved in the communication. For example, all application traffic originating from software applications $110_1$, $110_2$, ... $110_m$ is merged into a single VPN packet stream destined for VPN Server 141, and therefore all such traffic has identical transport packet headers. Therefore, transport network 103 is unable to discriminate between different types of traffic within VPN tunnel 132, and all VPN traffic is assigned to a single QoS bearer, such as a default QoS bearer $130_1$. Consequently, transport network 103 is unable to effectively implement meaningful QoS features with respect to VPN data traffic.

Figure 2:
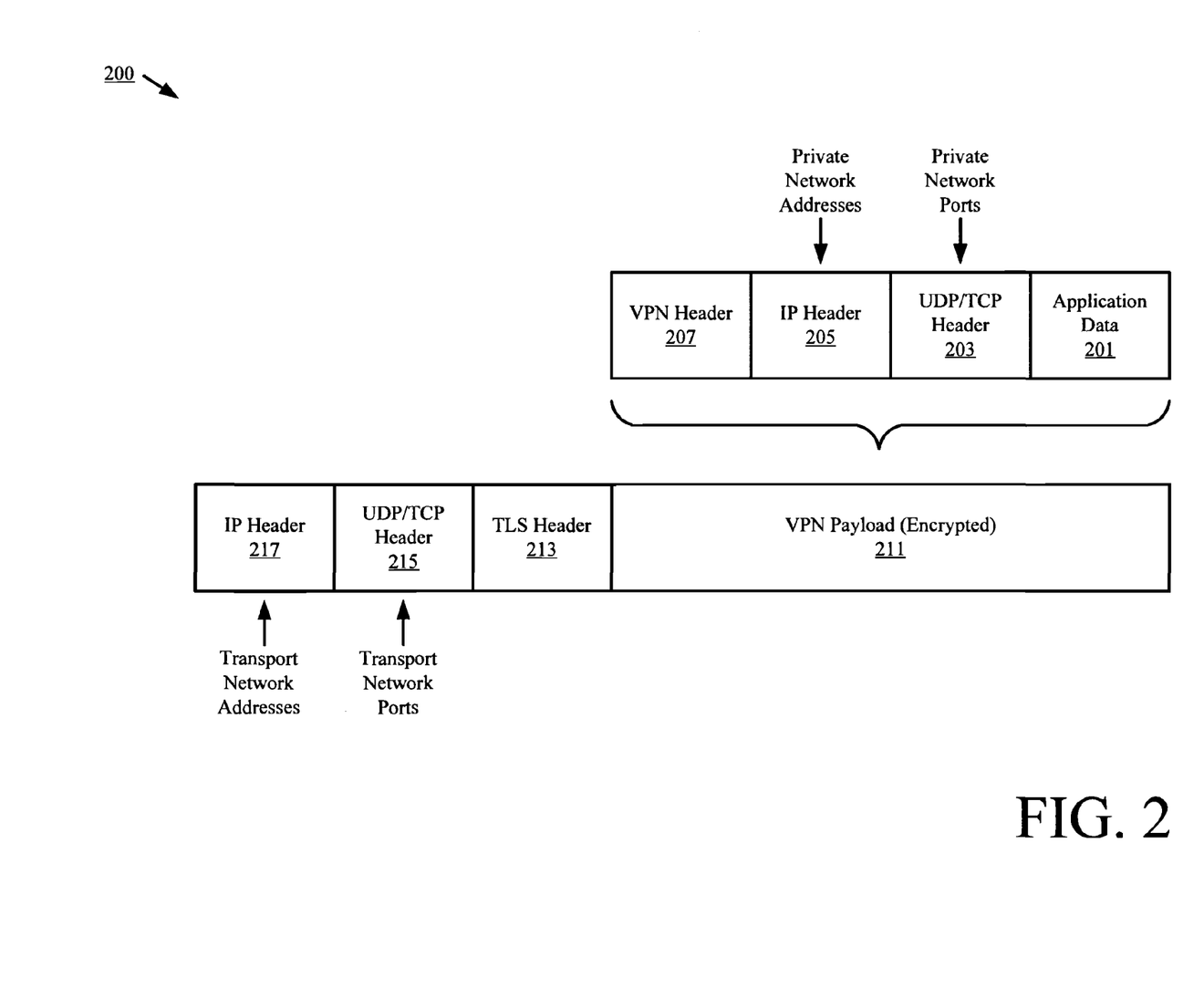
FIG. 2 is a schematic illustration of a transport data block that is useful for understanding the present invention.

Referring now to FIG. 2, there is provided a schematic illustration of an exemplary transport data block 200. Transport data block 200 can include, but is not limited to, a TCP/IP packet and/or a UDP/IP packet. Exemplary transport data block 200 comprises an IP datagram or packet that encapsulates VPN payload 211. VPN payload 211 is formed by encryption of an application packet comprising application data 201, UDP/TCP header 203, IP header 205, and VPN header 207. VPN header 207 is optional, and may contain further information of relevance to the relationship between the VPN client 119 and the VPN server 141. Such information may include, for example, cryptographic authentication information, cryptographic key identification, and/or other information associated with the specific implementation of the VPN. Transport data block 200 further includes TLS header 213, UDP/TCP header 215, and IP header 217. IP header 205 comprises source and destination addresses which identify network nodes in private network 105/305, such as the private network address for Remote Network Host 101/301, and application servers $150_1$, $150_2$, ... $150_o$. UDP/TCP header 203 comprises source and destination ports which identify applications within the source and destination nodes, respectively. IP header 217 comprises source and destination addresses which identify network nodes in transport network 103/303, such as the transport network address for Remote Network Host 101/301, and VPN server 141/341. UDP/TCP header 215 includes transport network ports which identify applications within the source and destination nodes, respectively.

Figure 3:
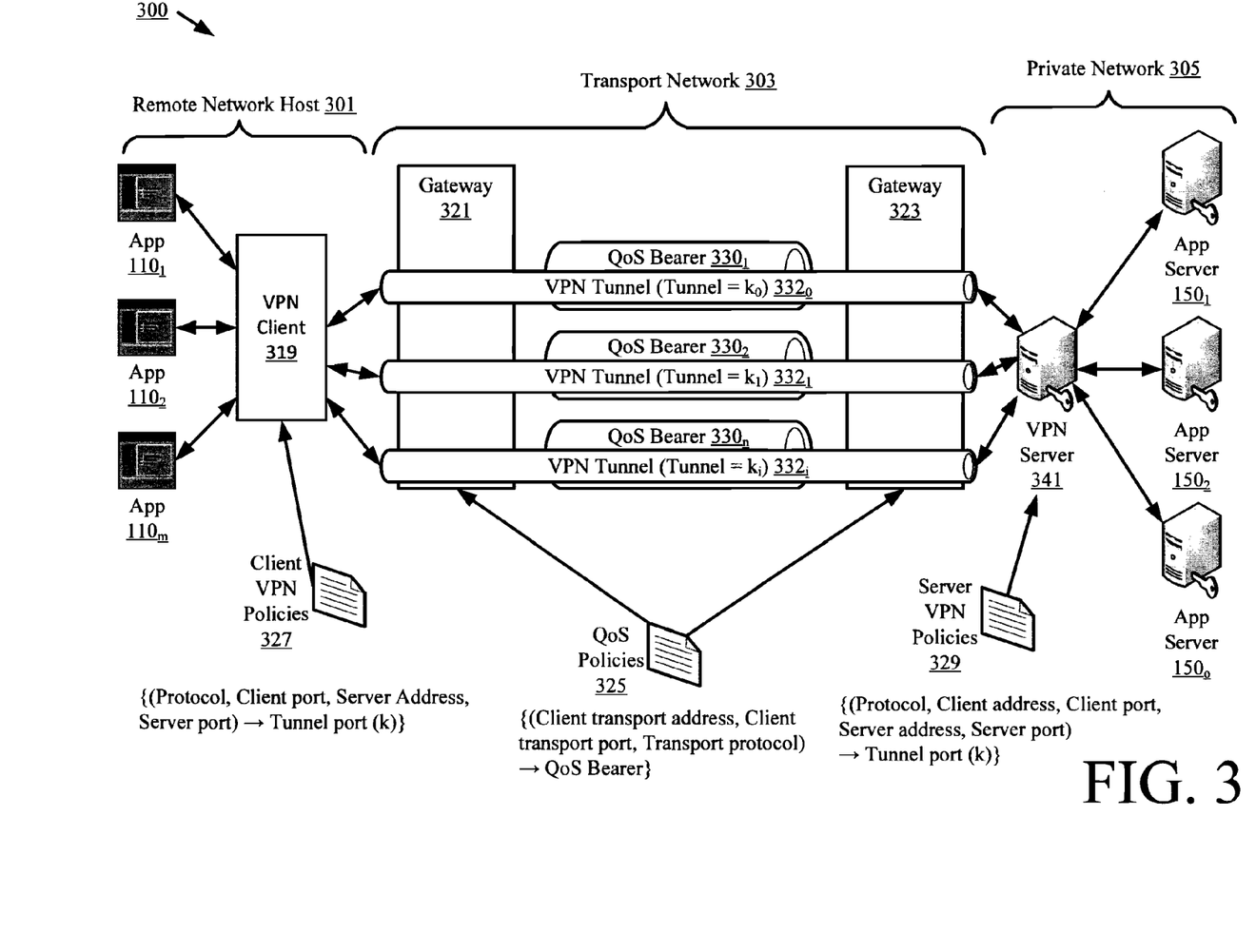
FIG. 3 is a schematic illustration of an exemplary system that is useful for understanding the present invention.

Referring now to FIG. 3, there is provided a schematic illustration of a system 300 which provides a multi-tunnel VPN according to an exemplary embodiment of the invention. Exemplary system 300 includes Remote Network Host 301, transport network 303, and private network 305. System 300 provides a multi-tunnel VPN, which allows system 300 to provide different QoS levels to VPN traffic as described in detail below.

Remote Network Host ("RNH") 301 comprises a processor (not shown) which executes a plurality of software application programs $110_1$, $110_2$, ... $110_m$, and VPN client 319. In one embodiment, the multi-tunnel VPN is transparent to software application programs $110_1$, $110_2$, ... $110_m$ so that there is no need to modify the software application programs for use with system 300. VPN client 319 and VPN server 341 are configured to establish a plurality of VPN tunnels $332_0$, $332_1$, ... $332_i$, each of which is associated with a particular QoS bearer $330_1$, $330_2$, ... $330_n$. Each of the VPN tunnels $332_0$, $332_1$, ... $332_i$ shares the same VPN endpoints. The VPN endpoints can include VPN client 319, which can be a VPN client software application executed by RNH 301, and VPN server software (not shown) executed by VPN server 341. Each alternate VPN tunnel $332_1$, ... $332_i$ is associated with default VPN tunnel $332_0$. The process of establishing VPN tunnels $332_0$, $332_1$, ... $332_i$ can be initiated by VPN client 319 and/or VPN server 341, as non-limiting examples.

The association between VPN tunnels and QoS bearers can be accomplished using a tunnel indicator, which acts as a flag to identify a VPN tunnel to the VPN endpoints, and to designate a QoS bearer in transport network 303. The tunnel indicator can be located in a transport packet header (e.g., TLS header 213, UDP/TCP header 215, and/or IP header 217). In the exemplary embodiment of FIG. 3, the tunnel indicator is a port number. Each VPN tunnel $332_0$, $332_1$, ... $332_i$, is associated with a single QoS bearer $330_1$, $330_2$, ... $330_n$ and a tunnel indicator $k_0$, $k_1$, ... $k_i$. The tunnel indicator $k_0$, $k_1$, ... $k_i$ can be implemented as a source or destination port, and can be specified within a transport packet header (e.g., UDP/TCP header 215). For example, the QoS bearer for a particular VPN tunnel can be specified by a client port (source or destination) in UDP/TCP header 215.

VPN client 319 applies client VPN policies 327 to in-bound and/or out-bound VPN traffic. In the out-bound direction, VPN client 319 applies client VPN policies 327 to application packets received from software application programs $110_1$, $110_2$, ... $110_m$, to assign each application packet to a VPN tunnel $332_0$, $332_1$, ... $332_i$. Client VPN policies 327 can include criteria such as application protocol, source port (e.g., RNH port), destination address (e.g., application server private network address), and/or destination port (e.g., application server port), as non-limiting examples. In an exemplary embodiment, client VPN policies 327 are effective to assign incoming application packets to a tunnel indicator, such as tunnel indicator $k_0$, $k_1$, ... $k_i$. In the in-bound direction, VPN client 319 decrypts transport packets received from transport network 303 using the cryptographic key and/or protocol associated with the corresponding VPN tunnel $332_0$, $332_1$, ... $332_i$, as described in detail below. VPN client 319 then routes the received packet to the appropriate application, which can be determined, for example, based on (decrypted) headers 203 and/or 205.

Transport network 303 is configured to inspect transport packets to determine a tunnel indicator therein. For example, transport network 303 can be configured to determine a tunnel indicator $k_0$, $k_1$, ... $k_i$ specified in each transport packet. Transport network 303 then applies QoS policies 325 to assign each transport packet to a QoS bearer $330_1$, $330_2$, ... $330_n$. These functions can be performed, for example, in gateway 321 and/or gateway 323, as non-limiting examples. For example, QoS policies 325 can be operative to assign transport packets to QoS bearers $330_1$, $330_2$, ... $330_n$ based on corresponding tunnel indicator $k_0$, $k_1$, ... $k_i$. The multi-tunnel VPN can be transparent to the transport network 303. In an exemplary embodiment, transport network 303 can be a conventional transport network, such as transport network 103, without a need for modification in order to accommodate the multi-tunnel VPN of system 300. Compatibility can be achieved, for example, by selecting a tunnel indicator based on existing QoS policies (e.g., QoS policies 125) in a conventional transport network.

Private network 305 comprises application servers $150_1$, $150_2$, ... $150_o$ and VPN server 341. VPN server 341 can assign a private network address on private network 305 to RNH 301 during VPN establishment as described in detail below with reference to FIG. 6. In a preferred embodiment, there is no need to make any changes to pre-existing application servers $150_1$, $150_2$, ... $150_o$ in order to allow them to work with system 300 and VPN server 341. VPN server 341 applies server VPN policies 329 to in-bound and out-bound VPN traffic. In the out-bound direction, VPN server 341 applies server VPN policies 329 to application packets received from application servers $150_1, 150_2, \ldots 150_o$, to assign each application packet to a VPN tunnel $332_0, 332_1, \ldots 332_i$. Server VPN policies 329 can include criteria such as application protocol, destination address (e.g., RNH private network address), destination port (e.g., RNH port), source address (e.g., application server private network address), and/or source port (e.g., application server port), as non-limiting examples. In an exemplary embodiment, server VPN policies 329 are effective to assign incoming application packets to a tunnel indicator, such as tunnel port $k_0, k_1, \ldots k_i$. In the in-bound direction, VPN server 341 applies server VPN policies 329 to transport packets received from transport network 303 to determine a corresponding VPN tunnel $332_0, 332_1, \ldots 332_i$, which can govern the selection of cryptographic keys and/or protocols as described below.

VPN Policy Configuration

VPN policies (e.g., client VPN policies 327 and server VPN policies 329) can be configured in a variety of ways. In one exemplary embodiment, the VPN policies can be configured to assign all data for a given application to the same VPN tunnel. In another exemplary embodiment, VPN policies can be configured to assign application messages from a given application to different VPN tunnels based on other criteria as discussed in detail below.

Table 1 depicts an exemplary client VPN policy (e.g., in client VPN policies 327) for assigning traffic to a VPN tunnel. Client VPN policies 327 provide a correspondence between traffic and VPN tunnels based on criteria such as application protocol, source port, destination address, and/or destination port of the application packet. Information about each VPN tunnel, such as cryptographic keys and/or protocols, can be stored in a separate data structure in the Remote Network Host.

TABLE 1

Client VPN policies 327

| App Protocol | Source Port | Destination Address | Destination Port | VPN Tunnel Indicator |
|---|---|---|---|---|
| TCP | Client Port 1 | App Server $150_1$ | App Server Port 1 | $k_0$ |
| TCP | Client Port 2 | App Server $150_2$ | App Server Port 2 | $k_1$ |
| TCP | Client Port 3 | App Server $150_3$ | App Server Port 3 | $k_2$ |
| UDP | Client Port 4 | App Server $150_4$ | App Server Port 4 | $k_3$ |

Table 2 depicts an exemplary server VPN policy for assigning traffic from each application server to a VPN tunnel based on application protocol, source address, source port, and destination port of the application packet. As discussed in detail below, the server VPN policy may be one of a plurality of server VPN policies (e.g., server VPN policies 329), with each server VPN policy associated with a particular VPN client. Information about each VPN tunnel, such as cryptographic keys and/or protocols, can be stored in a separate data structure in the VPN server.

TABLE 2

Server VPN policies 329

| App Protocol | Source Address | Source Port | Destination Port | VPN Tunnel Indicator |
|---|---|---|---|---|
| TCP | App Server $150_1$ | App Server Port 1 | Client Port 1 | $k_0$ |
| TCP | App Server $150_2$ | App Server Port 2 | Client Port 2 | $k_1$ |
| TCP | App Server $150_3$ | App Server Port 3 | Client Port 3 | $k_2$ |
| UDP | App Server $150_4$ | App Server Port 4 | Client Port 4 | $k_3$ |

Table 3 depicts an exemplary data structure for storing information about VPN tunnels, including cryptographic protocols and cryptographic keys. Data structures similar to Table 3 can be stored in the Remote Network Host and the VPN server. It will be understood that Table 3 is a simplified representation, and various modifications will be apparent.

TABLE 3

VPN Tunnels

| VPN Tunnel Indicator | Cryptographic Protocol | Cryptographic Key |
|---|---|---|
| $k_0$ | TLS 1.2 | Key1 |
| $k_1$ | TLS 1.2 | Key2 |
| $k_2$ | TLS 1.2 | Key3 |
| $k_3$ | TLS 1.2 | Key4 |

Table 4 depicts an exemplary transport network QoS policy (e.g., QoS policies 325) for assigning transport packets to QoS bearers (e.g., QoS bearer $330_1, 330_2, \ldots 330_n$) based on RNH transport network address and tunnel port. As discussed in detail below, the QoS policy may be one of a plurality of QoS policies in transport network 303, with each QoS policy associated with a particular VPN client or application server. It should be noted that transport network 303 need not be aware of the existence of the VPN tunnels. Client and server VPN policies can be designed to operate in conjunction with the existing QoS policies (e.g., QoS policies 125) in transport network 303 in order to avoid the need for any modifications to the transport network.

TABLE 4

QoS policies 325

| Transport Protocol | RNH Transport Address | RNH Transport Port (VPN Tunnel Indicator) | QoS Bearer |
|---|---|---|---|
| TCP | RNH 301 IP Address | $k_0$ | QoS bearer $130_1$ |
| TCP | RNH 301 IP Address | $k_1$ | QoS bearer $130_2$ |
| TCP | RNH 301 IP Address | $k_2$ | QoS bearer $130_3$ |
| UDP | RNH 301 IP Address | $k_3$ | QoS bearer $130_4$ |

In the exemplary QoS policy of table 4, the VPN Tunnel Indicator used to indicate the desired QoS bearer to the transport network 303 is a Remote Network Host Transport port number, which can be a source port or destination port of the transport data block (e.g., transport data block 200). For example, the port can be a UDP or TCP source or destination port in UDP/TCP header 215. However, it will be understood that the VPN Tunnel Indicator can be implemented in other ways.

As can be seen, the exemplary VPN policies of tables 1 and 2 work together to send traffic in both directions to the same tunnel for a given software application and application server. In other words, the VPN client policy and VPN server policy of table 1 and table 2, respectively, are matched such that traffic to and from the VPN server and VPN client is assigned to the same tunnel for a given application. For example, TCP traffic for an application hosted by application server $150_1$ and corresponding client software application $110_1$ operating on client port 1 is assigned to VPN tunnel indicator $k_0$ in both directions. However, it will be apparent that this need not be the case. For example, messages from the server to the client may be deemed higher priority than messages from the client to the server, or vice versa.

While tables 1 and 2 illustrate relatively simple VPN policies, it will be apparent to those of ordinary skill in the art that more complex tables and/or functions can be used to assign traffic to VPN tunnels. For example, additional or different criteria can be used by the client and server VPN policies and/or transport network QoS policies. In one exemplary embodiment, message content can be used as a criteria in a VPN policy. For example, VPN client 319 can be configured to inspect the content of application messages. The inspection can include performing keyword searches on the text of an application message to determine whether the message contains words that indicate a high priority for the message. The inspection can also include analyzing an application message to determine whether high priority data types are contained therein. Application messages designated as high priority can then be assigned to a high-priority VPN tunnel.

While Table 3 shows a single cryptographic key to be used for both encryption and decryption, this need not be the case. In an exemplary embodiment, each VPN tunnel can use different cryptographic keys for encryption and decryption, e.g., in accordance with an asymmetric (e.g., public key) encryption system. In another exemplary embodiment, high-priority VPN tunnels can be associated with more secure encryption protocols and/or longer (and more secure) cryptographic keys. Additional modifications and enhancements will become apparent as the discussion progresses.

VPN Policy Provisioning

VPN policies can be provisioned according to a variety of provisioning methods. In an exemplary embodiment, client and server VPN policies can be configured at the transport network (e.g., in gateway 321 and/or 325) and provisioned to VPN server 341 (e.g., via default VPN tunnel $332_0$), and then from the VPN server 341 to VPN client 319. In another exemplary embodiment, client and server VPN policies can be configured at VPN server 341 and provisioned to VPN client 319. In yet another exemplary embodiment, VPN policies are configured at the Remote Network Host and provisioned to the VPN server. For example, VPN policies can be provisioned during a VPN tunnel initialization phase.

Figure 4:
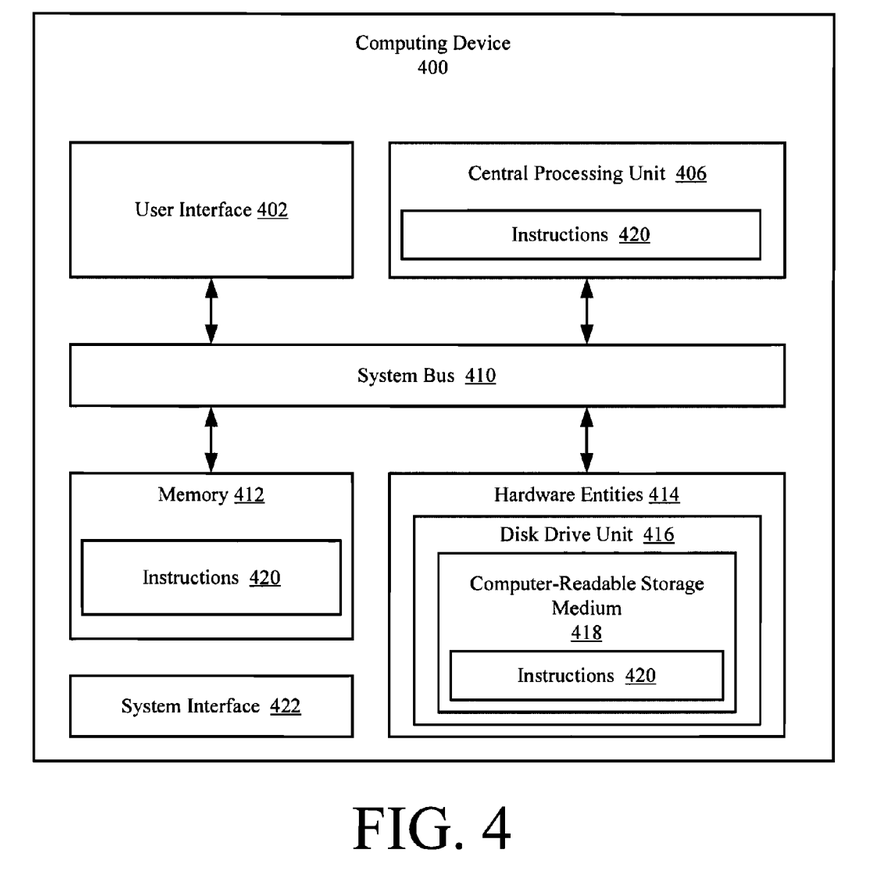
FIG. 4 is a block diagram of an exemplary computing device that is useful for understanding the present invention.

Referring now to FIG. 4, there is provided a block diagram of an exemplary embodiment of a computing device 400 which can be used to implement Remote Network Host 301 and/or VPN server 341. Computing device 400 can include, but is not limited to, a notebook, a desktop computer, a laptop computer, a personal digital assistant, and a tablet PC. Notably, some or all the components of the computing device 400 can be implemented as hardware, software and/or a combination of hardware and software. The hardware includes, but is not limited to, one or more electronic circuits. Examples of hardware components include mainframes, Reduced Instruction Set Computer ("RISC") architecture based servers, storage devices, networks and networking components. Examples of software components include network application client/server software, VPN client/server software, and database software.

Computing device 400 may include more or less components than those shown in FIG. 4. However, the components shown are sufficient to disclose an illustrative embodiment implementing the present invention. The hardware architecture of FIG. 4 represents one embodiment of a representative computing device configured to facilitate the provision of QoS features in a multi-tunnel VPN. As such, the computing device 400 of FIG. 4 implements improved methods for providing QoS features in a transport network providing a plurality of QoS bearers in accordance with embodiments of the present invention.

As shown in FIG. 4, the computing device 400 includes a system interface 422, a user interface 402, a Central Processing Unit ("CPU") 406, a system bus 410, a memory 412 connected to and accessible by other portions of computing device 400 through system bus 410, and hardware entities 414 connected to a system bus 410. At least some of the hardware entities 414 perform actions involving access to and use of memory 412, which can be a Random Access Memory ("RAM"), a disk driver and/or a Compact Disc Read Only Memory ("CD-ROM").

System interface 422 allows the computing device 400 to communicate directly or indirectly with external communication devices (e.g., communication devices of transport network 303 of FIG. 3). For example, computing device 400 may communicate indirectly with an external communication device (e.g., VPN server 341, application servers $150_1$, $150_2$, . . . $150_o$) by sending and receiving communications through a common network (e.g., transport network 303 shown in FIG. 3).

Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used herein, refers to a single medium or multiple media (e.g., a centralized or distributed database, and/or associated caches and servers) that store the one or more sets of instructions 420. The term "machine-readable media", as used herein, also refers to any medium that is capable of storing, encoding or carrying a set of instructions 420 for execution by the computing device 400 and that cause the computing device 400 to perform any one or more of the methodologies of the present disclosure.

In some embodiments of the present invention, the hardware entities 414 include an electronic circuit (e.g., a processor) programmed for facilitating the provision of QoS features in a multi-tunnel VPN. In this regard, it should be understood that the electronic circuit can access and run VPN software applications (not shown in FIG. 4) installed on the computing device 400. The VPN software applications are generally operative to facilitate the provision of a multi-tunnel VPN. These services include, but are not limited to, cryptographic services, VPN negotiation services, and packet inspection services. The listed services and other services provided by the computing device 400 will become more apparent as the discussion progresses.

Figure 5:
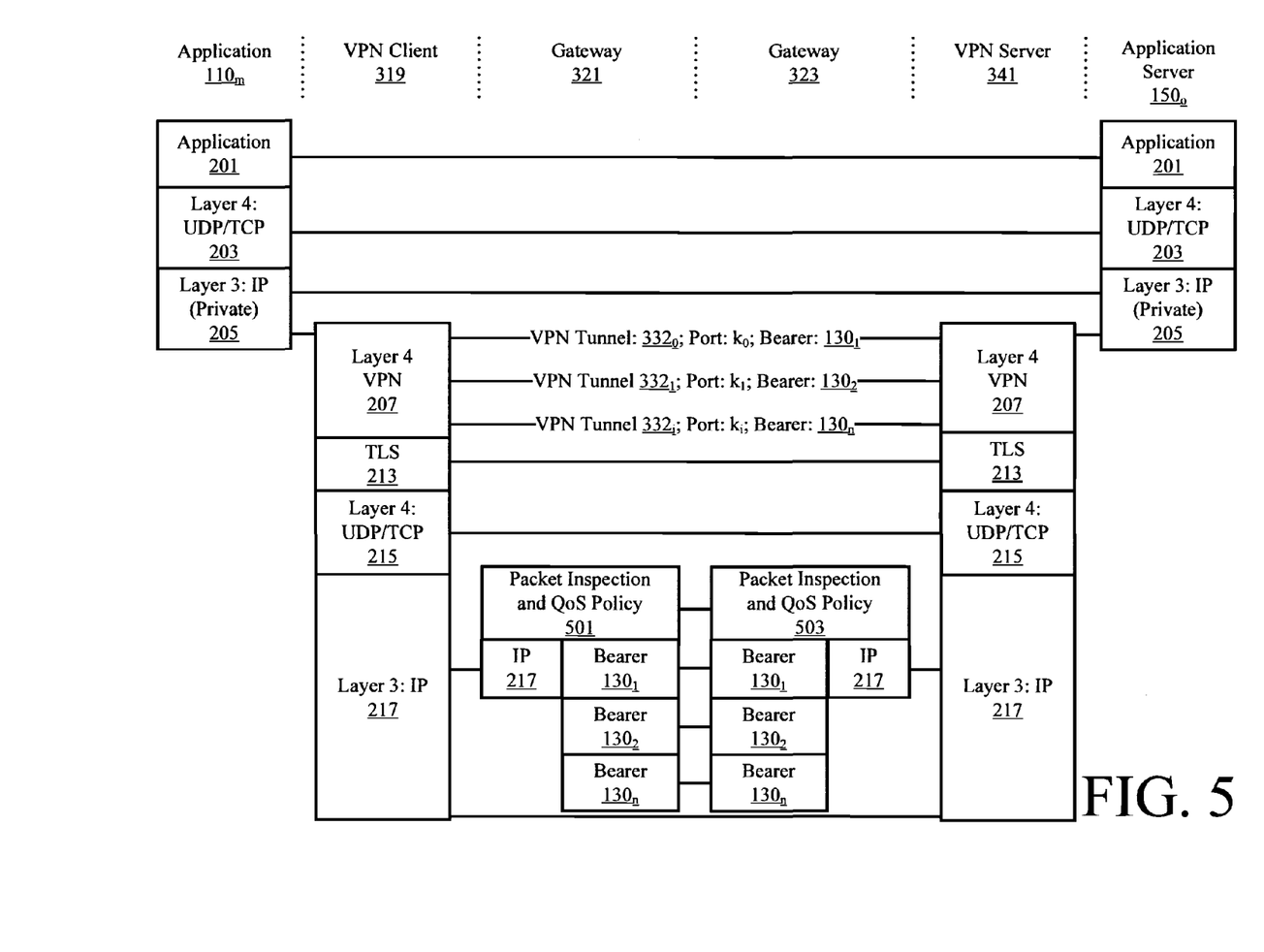
FIG. 5 is a network layer diagram that is useful for understanding the present invention.

Referring now to FIG. 5, there is provided a network layer diagram for providing a multi-tunnel VPN according to an exemplary embodiment. The individual network layers 201-217 have already been described with reference to FIG. 2. Each network layer is shown below the corresponding component of exemplary system 300 (shown in FIG. 3) which operates at that layer. Specifically, software applications $110_1$, $110_2$, . . . $110_m$ and application servers $150_1$, $150_2$, . . . $150_o$ operate at application data layer 201, UDP/TCP layer 203, and IP layer 205. VPN client 319 and VPN server 341 operate to provide a multi-tunnel VPN comprising a plurality of VPN tunnel $332_0$, $332_1$, . . . $332_i$ at VPN layer 207. Each VPN tunnel $332_0$, $332_1$, . . . $332_i$ is associated with a single QoS bearer $330_1$, $330_2$, . . . $330_m$ as described above. Gateway 321 and gateway 323 perform packet inspection and apply QoS policies (e.g., QoS policies 325) in IP layer 217 at blocks 501 and 503, respectively. Based on packet inspection 501 and 503, each transport packet is assigned to a QoS bearer $330_1, 330_2, \ldots 330_n$ for transmission through transport network 303.

Various modifications to the exemplary embodiment shown in FIG. 5 will be apparent to those of ordinary skill in the art. For example, the multi-tunnel VPN can be provided at a network layer other than layer 207. As another example, software applications $110_1, 110_2, \ldots 110_m$ need not perform packetization of application data, and can provide application data directly to VPN client 319, which can perform packetization of application data prior to VPN encryption and encapsulation.

Figure 6:
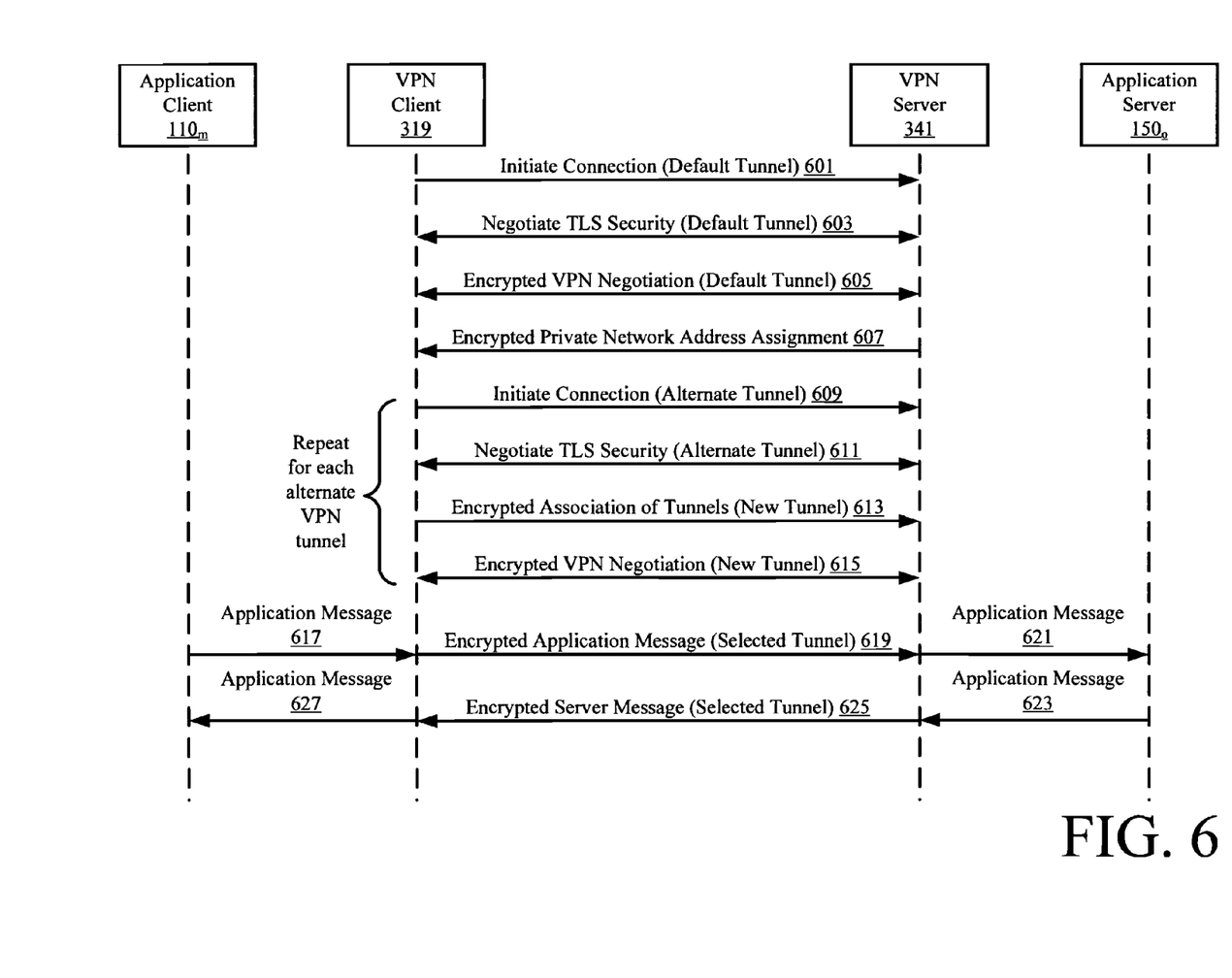
FIG. 6 is a process flow diagram for a VPN tunnel establishment process according to an exemplary method that is useful for understanding the present invention.

Referring now to FIG. 6, there is provided a process flow diagram for establishing a plurality of VPN tunnels between two VPN endpoints (e.g., VPN client 319 and VPN server 341) over a transport network (e.g., transport network 303). In the exemplary embodiment of FIG. 6, the process begins at step 601 when VPN client 319 initiates a connection for a default VPN tunnel (e.g., default VPN tunnel $332_0$) to VPN server 341. At step 603, VPN client 319 and VPN server 341 negotiate TLS security for the default VPN tunnel (e.g., default VPN tunnel $332_0$). Step 603 can include negotiation of encryption and/or decryption keys, and cryptographic protocols to be used for the default tunnel. At step 605, VPN client 319 and VPN server 341 perform encrypted VPN negotiation for the default VPN tunnel. At step 607, VPN server 341 assigns a private network address (e.g., in private network 305) to VPN client 319. At step 609, VPN client 319 initiates a connection for a new alternate tunnel (e.g., VPN tunnel $332_1, \ldots 332_i$). At step 611, VPN client 319 and VPN server 341 negotiate TLS security for the new alternate VPN tunnel. Step 611 can include negotiation of encryption and/or decryption keys, and cryptographic protocols to be used for the new alternate tunnel. At step 613, VPN client 319 and VPN server 341 perform encrypted association so that new alternate VPN tunnel is associated with the default VPN tunnel established in step 605. At step 615, VPN client 319 and VPN server 341 perform encrypted VPN negotiation for the new alternate VPN tunnel.

Steps 617-627 describe a two-way communication flow between a software application (e.g., software application $110_1, 110_2, \ldots 110_m$) in a Remote Network Host (e.g., Remote Network Host 301) and an application server (e.g., application server $150_1, 150_2, \ldots 150_o$) in a private network (e.g., private network 305). At step 617, VPN client 319 receives an application message from a software application $110_m$. At step 619, VPN client 319 communicates the encrypted application message over a selected VPN tunnel (e.g., VPN tunnel $332_0, 332_1, \ldots 332_i$) to VPN server 341. At step 621, VPN server 341 decrypts the encrypted application message and routes the decrypted application message to the destination application server $150_o$. At step 623, the application server $150_o$ generates a response comprising a second application message, and communicates the second application message to VPN server 341. At step 625, VPN server encrypts the second application message in an encrypted server message, and communicates the encrypted server message to VPN client 319 over a selected VPN tunnel (e.g., VPN tunnel $332_0, 332_1, \ldots 332_i$). Notably, the selected tunnel used at step 625 is not necessarily the same tunnel selected at step 619. At step 627, the VPN client 319 communicates the second application message to the original software application that generated the application message at step 617.

Various modifications to the exemplary embodiment shown in FIG. 6 will be apparent to those of ordinary skill in the art. For example, VPN connections may be initiated by either VPN endpoint (e.g., VPN server 341). In an exemplary embodiment, all VPN tunnels can be established (e.g., steps 601-615) during a VPN initialization phase. For example, a VPN tunnel can be established for each QoS bearer provided by the transport network during a VPN initialization phase. In another exemplary embodiment, steps 601-607 (i.e., default tunnel establishment) are performed during an initialization phase, and steps 609-615 (alternate tunnel establishment) are performed "on the fly" to create new alternate VPN tunnels on an as-needed basis (e.g., as requests for different QoS levels are received from software applications $110_1, 110_2, \ldots 110_m$ and/or application servers $150_1, 150_2, \ldots 150_o$).

Figure 7:
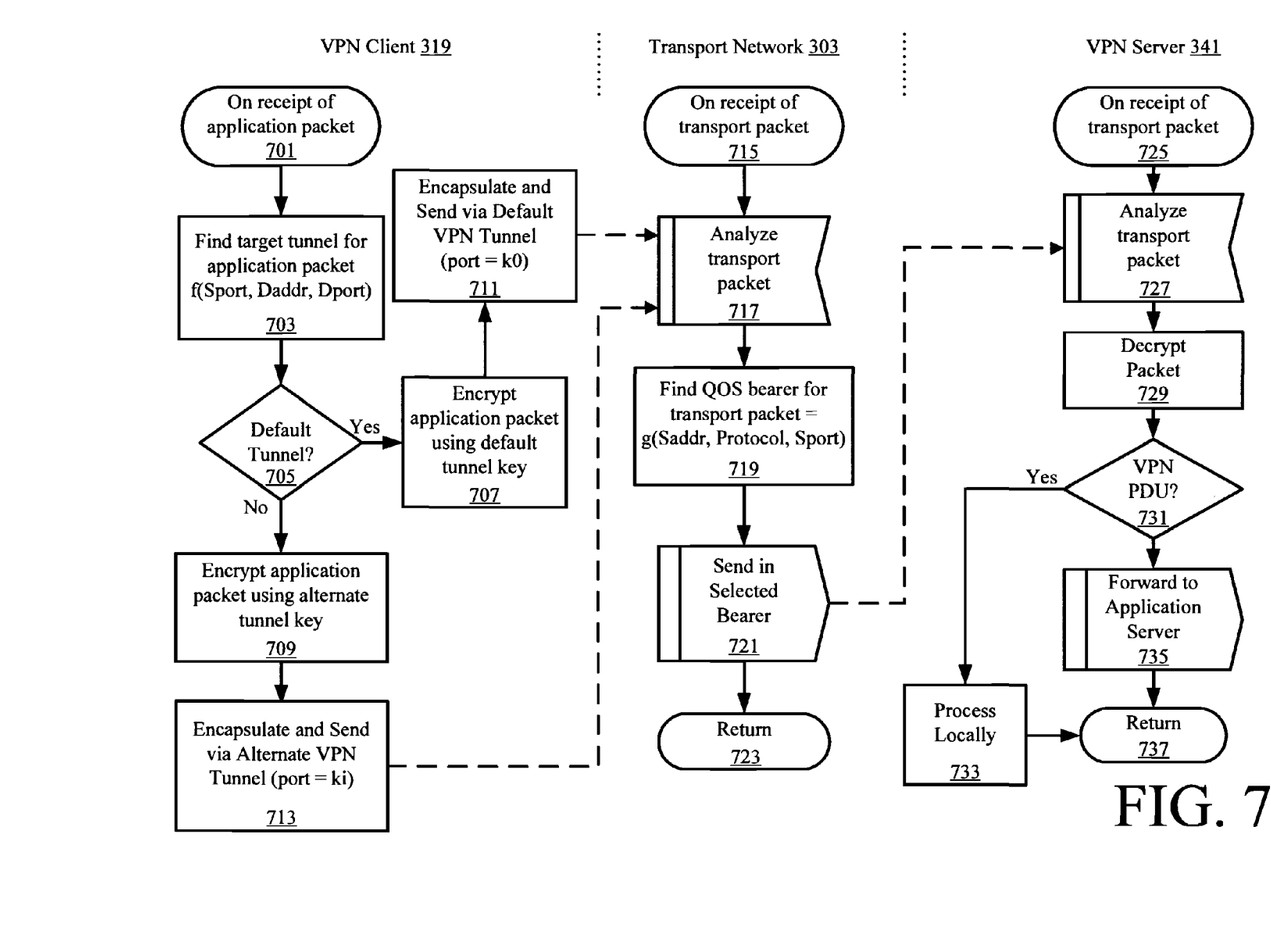
FIG. 7 is a process flow diagram of an exemplary method that is useful for understanding the present invention.
Figure 8:
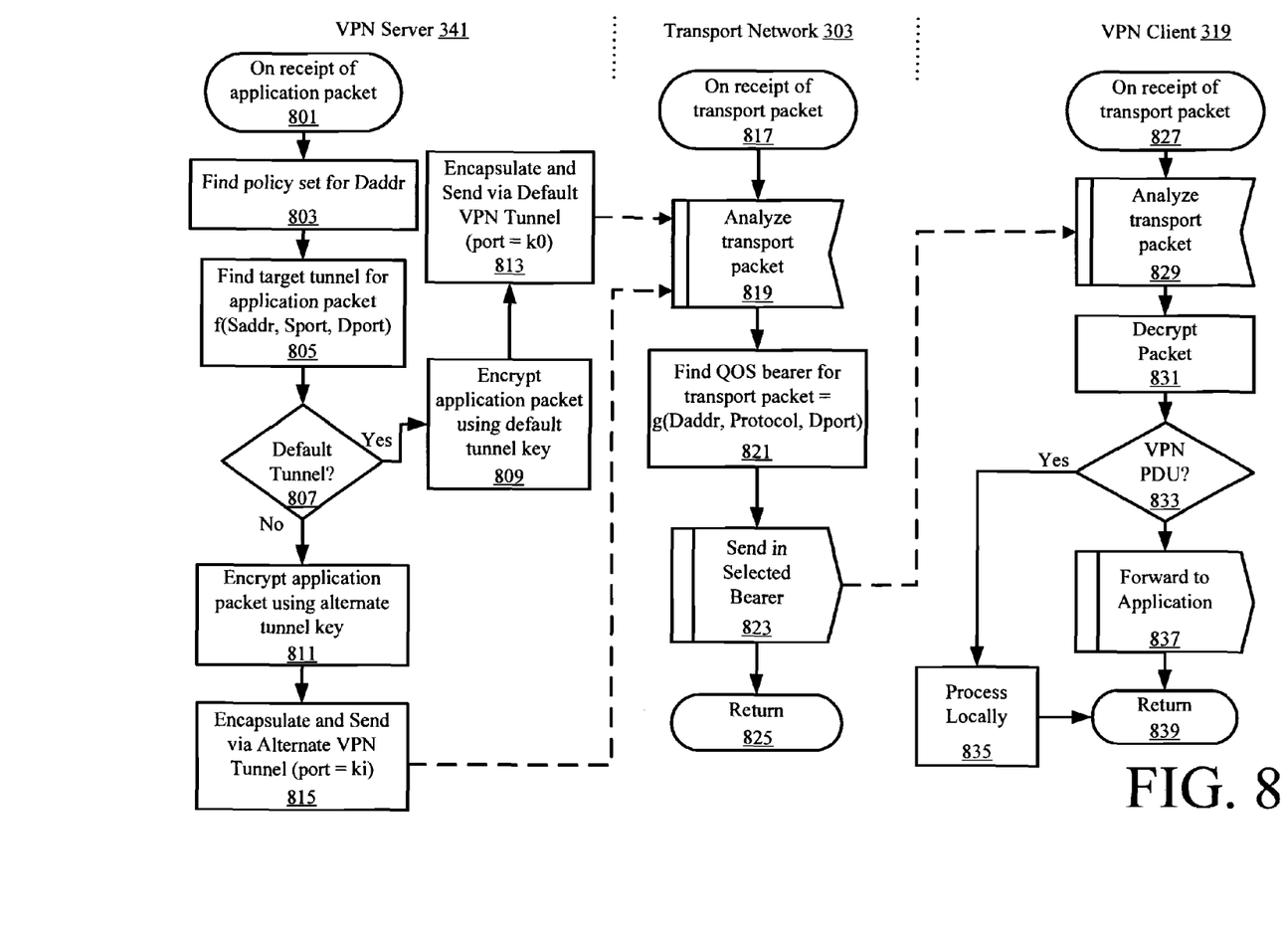
FIG. 8 is a process flow diagram of an exemplary method that is useful for understanding the present invention.

FIGS. 7 and 8 collectively provide an exemplary detailed process flow diagram for handling traffic in both directions between two VPN endpoints in an exemplary system providing a multi-tunnel VPN, such as exemplary system 300. FIG. 7 provides a process flow diagram for traffic from a VPN client (e.g., VPN client 319) to a VPN server (e.g., VPN server 341), and FIG. 8 provides a process flow diagram for traffic from a VPN server to a VPN client. The exemplary process of FIGS. 7 and 8 can optionally be performed after a VPN initialization phase (e.g., steps 601-615 of FIG. 6) wherein a plurality of VPN tunnels are established between the VPN endpoints. However, VPN tunnels can also be established as needed, in the manner discussed above (instead of, or in addition to using a VPN initialization phase).

Referring now to FIG. 7, at step 701, VPN client 319 receives an application packet (or "application message" or, more broadly, an "application data block") comprising application data from a software application (e.g., software application $110_1, 110_2, \ldots 110_m$).

At step 703, VPN client 319 analyzes the application packet to determine at least one characteristic thereof. This analysis can include an analysis of application packet headers to determine information such as application protocol, source port ("Sport"), destination address ("Daddr"), destination port ("Dport"), requested QoS level, and message importance, as non-limiting examples. The analysis can optionally include an inspection of the application data and/or message content in the application packet (i.e., "deep packet inspection"). Based on the results of the analysis, VPN client 319 applies client VPN policies (e.g., client VPN policies 327) to assign the application packet to a VPN tunnel. The criteria in client VPN policies 327 can include any of the application packet properties determined by the analysis, including, but not limited to, the properties listed above. Still at step 703, VPN client 319 selectively assigns the application packet to a VPN tunnel (e.g., plurality of VPN tunnels $332_0, 332_1, \ldots 332_i$) based on the applied client VPN policies 327. As discussed above with reference to FIG. 6, the assigned VPN tunnel can be an already established VPN tunnel or it can be established as needed e.g., at step 703.

Step 705 is a decision block. If the application packet was assigned to the default VPN tunnel (e.g., default VPN tunnel $332_0$) then flow proceeds to block 707. Otherwise, if the application packet was assigned to an alternate VPN tunnel (e.g., one of alternate VPN tunnels $332_1, \ldots 332_i$) then flow proceeds to block 709.

At step 707, VPN client 319 encrypts the application packet using the encryption key and cryptographic protocol associated with the default VPN tunnel (e.g., "Key1" from table 3) to create an encrypted VPN payload (e.g., VPN payload 211).

At step 711, VPN client 319 encapsulates the VPN payload in a transport packet (or "transport datagram," or more broadly, a "transport data block"). The structure of the transport packet can be the same as, or similar to, transport data block 200. The transport packet includes a tunnel indicator associated with the default VPN tunnel. For example, the tunnel indicator for default VPN tunnel $332_0$ can be set by setting the source (client) port equal to tunnel port $k_0$ in a transport packet header (e.g., UDP/TCP header 215) as discussed above.

At step 709, VPN client 319 encrypts the application packet using the encryption key and cryptographic protocol associated with the assigned alternate VPN tunnel (e.g., "Key2" or "Key3" from table 3) to create an encrypted VPN payload (e.g., VPN payload 211).

At step 713, VPN client 319 encapsulates the VPN payload in a transport packet in a similar fashion as in step 711, except that the transport packet includes a tunnel indicator associated with the assigned alternate VPN tunnel. For example, the tunnel indicator for alternate VPN tunnel $332_1$ can be set by setting the source (client) port equal to tunnel port $k_1$ in a transport packet header (e.g., UDP/TCP header 215) as discussed above. Subsequent to encapsulation at step 711 or 713, VPN client 319 communicates the transport packet to transport network 303.

At step 715, transport network 303 receives the transport packet from VPN client 319. At step 717, transport network 303 analyzes the received transport packet. This analysis can include an analysis of the transport packet headers to determine information such as transport protocol, source address, source port, destination address, and destination port. At step 719, based on the results of the analysis of step 717, transport network 303 applies QoS policies (e.g., QoS policies 325) to assign the transport packet to a QoS bearer $130_1, 130_2, \ldots 130_n$.

At step 721, transport network 303 then routes the transport packet through transport network 303 using the assigned QoS bearer and corresponding service level. At step 723, the packet-handling process in transport network 303 is complete. As will be apparent to those of ordinary skill in the art, steps 715-723 can be performed multiple times in various nodes of transport network 303 (e.g., gateway 321 and/or gateway 323) as the transport packet is routed through transport network 303.

At step 725, VPN server 341 receives a transport packet from transport network 303. At step 727, VPN server 341 analyzes the received transport packet. This analysis can include an analysis of the transport packet headers to determine a tunnel indicator therein (e.g., in source or destination port in UDP/TCP header 215). The transport packet analysis identifies a VPN tunnel associated with the transport packet based on a tunnel indicator located in the transport packet. In other words, VPN server 341 determines whether the transport packet corresponds to default VPN tunnel $332_0$ or an alternate VPN tunnel $332_1, \ldots 332_i$. Still at step 727, VPN server 341 determines a at least one cryptographic key and/or cryptographic protocol corresponding to the identified VPN tunnel. For example, step 727 can include retrieving VPN tunnel information from a data structure similar to Table 3 stored in VPN server 341.

At step 729, VPN server 341 decrypts the VPN payload in the transport packet. VPN server 341 can perform the decryption using a cryptographic key and cryptographic protocol determined at step 727.

At step 731, VPN server 341 analyzes the decrypted application packet obtained by decrypting the VPN payload. This analysis can include an analysis of application packet headers (e.g., UDP/TCP header 203, IP header 205, and/or VPN header 207 from FIG. 2). Based on the results of the analysis, VPN server 341 determines whether the received application packet comprises a VPN Protocol Data Unit ("PDU"). A VPN PDU is a VPN-related message intended to be processed by a VPN endpoint. For example, a VPN PDU can instruct the VPN endpoint to change a cryptographic protocol and/or cryptographic, or to update a VPN policy (e.g., client VPN policy 327 or server VPN policy 329). Step 731 is a decision block. If it is determined that the application packet comprises a VPN PDU, then flow proceeds to step 733 where the VPN PDU is processed locally. Otherwise flow proceeds to step 735.

At step 735, VPN server 341 determines the appropriate recipient application server (e.g., application server $150_1, 150_2, \ldots 150_O$), which can be determined, for example, based on the destination address of the application packet (e.g., in IP header 205). VPN server 341 then forwards the application packet through private network 305 to the appropriate application server. At step 737 the packet-handling process in VPN server 341 is complete. The appropriate application server receives the application packet and may generate a response thereto for transmission back to VPN client 319.

Referring now to FIG. 8, at step 801, VPN server 341 receives an application packet (or "application message" or, more broadly, an "application data block") comprising application data from an application server (e.g., application server $150_1, 150_2, \ldots 150_O$) via private network 305.

At step 803, VPN server 341 analyzes the application packet to determine at least one characteristic thereof. This analysis can include an analysis of the application packet headers to determine information such as application protocol, source port, destination address, destination port, requested QoS level, message importance. The analysis can optionally include an inspection of the application data and/or message content in the application packet (i.e., "deep packet inspection"). Based on the results of this analysis, VPN server 341 selects a server VPN policy from a plurality of server VPN policies (e.g., server VPN policies 329). For example, VPN server 341 can be configured to select a server VPN policy associated with VPN client 319, as determined by the destination address of the application packet.

At step 805, VPN server 341 applies the selected server VPN policy to assign the application packet to a VPN tunnel. The criteria in server VPN policies 329 can include any of the application packet properties determined by the analysis, including, but not limited to, the properties listed above. VPN server 341 selectively assigns the application packet to a VPN tunnel (e.g., plurality of VPN tunnels $332_0, 332_1, \ldots 332_i$) based on the applied server VPN policies 329. As discussed above with reference to FIG. 6, the assigned VPN tunnel can be an already established VPN tunnel or it can be established "on the fly," e.g., at step 803.

Step 807 is a decision block. If the application packet was assigned to the default VPN tunnel (e.g., default VPN tunnel $332_0$) then flow proceeds to block 809. Otherwise, if the application packet was assigned to an alternate VPN tunnel (e.g., one of alternate VPN tunnels $332_1, \ldots 332_i$) then flow proceeds to block 811.

At step 809, VPN server 341 encrypts the application packet using the encryption key and cryptographic protocol associated with the default VPN tunnel (e.g., "Key1" from table 3) to create an encrypted VPN payload (e.g., VPN payload 211).

At step 813, VPN server 341 encapsulates the VPN payload in a transport packet (or "transport datagram," or more broadly, a "transport data block"). The structure of the transport packet can be the same as, or similar to, transport data block 200. The transport packet includes a tunnel indicator associated with the default VPN tunnel. For example, the tunnel indicator for default VPN tunnel $332_0$ can be set by setting the destination (client) port equal to tunnel port $k_0$ in a transport packet header (e.g., UDP/TCP header 215) as discussed above.

At step 811, VPN server 341 encrypts the application packet using the encryption key and cryptographic protocol associated with the assigned alternate VPN tunnel (e.g., "Key2" or "Key3" from table 3) to create an encrypted VPN payload (e.g., VPN payload 211).

At step 815, VPN server 341 encapsulates the VPN payload in a transport packet in a similar fashion as in step 811, except that the transport packet includes a tunnel indicator associated with the assigned alternate VPN tunnel. For example, the tunnel indicator for alternate VPN tunnel $332_1$ can be set by setting the destination (client) port equal to tunnel port $k_1$ in a transport packet header (e.g., UDP/TCP header 215) as discussed above. Subsequent to encapsulation at step 813 or 815, VPN server 341 communicates the transport packet to transport network 303.

At step 817, transport network 303 receives the transport packet from VPN server 341. At step 819, transport network 303 analyzes the received transport packet. This analysis can include an analysis of the transport packet headers to determine information such as transport protocol, source address, source port, destination address, and destination port. At step 821, based on the results of the analysis of step 819, transport network 303 applies QoS policies (e.g., QoS policies 325) to assign the transport packet to a QoS bearer $330_1$, $330_2$, ... $330_n$.

At step 823, transport network 303 routes the transport packet through transport network 303 using the assigned QoS bearer and corresponding service level. At step 825, the packet-handling process in transport network 303 is complete. As will be apparent to those of ordinary skill in the art, steps 817-825 can be performed multiple times in various nodes of transport network 303 (e.g., gateway 321 and/or gateway 323) as the transport packet is routed through transport network 303.

At step 827, VPN client 319 receives a transport packet from transport network 303. At step 829, VPN client 319 analyzes the received transport packet. This analysis can include an analysis of the transport packet headers to determine a tunnel indicator therein (e.g., in source or destination port in UDP/TCP header 215). Based on the results of this analysis, VPN client 319 determines a VPN tunnel associated with the transport packet based on the tunnel indicator. In other words, VPN client 319 determines whether the transport packet corresponds to the default VPN tunnel $332_0$ or an alternate VPN tunnel $332_1$, ... $332_i$. Information for the identified VPN tunnel, including at least one cryptographic key and/or cryptographic protocol, is then retrieved from a separate data structure, such as a table similar to Table 3.

At step 831, VPN client 319 decrypts the VPN payload in the transport packet. VPN client 319 can perform the decryption using a cryptographic key and cryptographic protocol determined at step 829.

At step 833, VPN client 319 analyzes the decrypted application packet obtained by decrypting the VPN payload. This analysis can include an analysis of application packet headers (e.g., UDP/TCP header 203, IP header 205, and/or VPN header 207 from FIG. 2). Based on the results of the analysis, VPN client 319 determines whether the received application packet comprises a VPN PDU. Step 833 is a decision block. If it is determined that the application packet comprises a VPN PDU, then flow proceeds to step 835 where the VPN PDU is processed locally. Otherwise flow proceeds to step 837.

At step 837, VPN client 319 determines the appropriate recipient software application (e.g., software application programs $110_1$, $110_2$, ... $110_m$), which can be determined, for example, based on the destination port of the application packet (e.g., in UDP/TCP header 203). VPN client 319 then forwards the application packet to the appropriate software application. At step 839 the packet-handling process in VPN client 319 is complete.

Various modifications to the exemplary embodiment shown in FIGS. 7-8 will be apparent to those of ordinary skill in the art, and many exemplary modifications have already been discussed above.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. A method for controlling Quality-of-Service ("QoS") in a Virtual Private Network ("VPN") in a transport network providing a plurality of QoS bearers, the method comprising:

establishing, between a first VPN endpoint and a second VPN endpoint, a plurality of VPN tunnels through said transport network, said plurality of VPN tunnels including at least a default VPN tunnel associated with a first QoS bearer and an alternate VPN tunnel associated with a second QoS bearer;

establishing at the first and second VPN endpoints a VPN policy which specifies at least two different QoS levels to be applied to transport packets in accordance with at least one characteristic of the application data contained therein, the VPN policy specified independently of a transport network policy established for the transport network which also specifies at least two different QoS levels to be applied to transport packets; and performing the following steps at said first VPN endpoint:
receiving a first data block of a plurality of data blocks specifying application messages generated by at least two software applications, each said data block comprising application data;
analyzing said first data block to determine at least one said characteristic of the application data contained therein;
applying the VPN policy to said first data block whereby said default VPN tunnel or said alternate VPN tunnel is assigned to the first data block based on the characteristic of the application data in accordance with the VPN policy;

selectively assigning a VPN tunnel indicator to the first data block that defines a QoS in the transport network which is different from the QoS which would be assigned to a transport packet including the first data block by the transport network in the presence of encryption;

encrypting said first data block to generate a VPN payload;

encapsulating said VPN payload with a transport packet header to form a transport packet, said transport packet header including the VPN tunnel indicator which specifies which one of the default VPN tunnel and the alternate VPN tunnel was previously assigned to the first data block; and communicating said transport packet to the transport network where a QoS policy is applied to assign the transport packet to the first QoS bearer or the second QoS bearer based on the VPN tunnel indicator contained in the transport packet header;

wherein the transport packet is communicated across the transport network using one of the first or second QoS bearers as determined in accordance with the VPN policy, independently of the transport network policy for the application data having said characteristic.

2. The method according to claim 1, wherein the first data block is encrypted using a cryptographic key and a cryptographic protocol.

3. The method according to claim 1, wherein said at least one characteristic of said first data block comprises an application identifier, an application type, or an application protocol.

4. The method according to claim 1, wherein said VPN tunnel indicator comprises a port number.

5. The method according to claim 1, wherein said first VPN endpoint is implemented as a VPN client in a remote host computing device and said application data is received from a software application executing in said remote host computing device.

6. The method according to claim 1, wherein said first VPN endpoint is implemented as a VPN server, said second VPN endpoint is implemented as a VPN client, and said application data is received from an application server in communication with said VPN server via a private computer network.

7. The method according to claim 6, further comprising:
selecting said VPN policy from a plurality of VPN policies based on a destination address associated with said VPN client.

8. The method according to claim 1, wherein
said first VPN endpoint is implemented as a VPN server,
said second VPN endpoint is implemented as a VPN client, and
said VPN policy is configured at said transport network and provided to a VPN client via said transport network and said VPN server.

9. The method according to claim 1, further comprising communicating over said default VPN tunnel and said alternate VPN tunnel using a Transport Layer Security ("TLS") protocol provided at layer 4 of a TCP/IP protocol stack.

10. The method according to claim 1, further comprising:
performing the following steps at said first VPN endpoint:
receiving a transport data block from said second VPN endpoint, said transport data block comprising a VPN payload and at least one indicator specifying one of said default VPN tunnel and said alternate VPN tunnel;

analyzing said transport data block to determine said indicator;

selecting at least one of a cryptographic key and a cryptographic protocol based on said indicator; and decrypting said VPN payload using a cryptographic key and a cryptographic protocol in accordance with said selecting.

11. A system for controlling Quality-of-Service ("QoS") in a Virtual Private Network ("VPN") in a transport network providing a plurality of QoS bearers, the system comprising:
at least one electronic circuit configured to:
establish, between a first VPN endpoint and a second VPN endpoint, a plurality of VPN tunnels through said transport network, said plurality of VPN tunnels including at least a default VPN tunnel associated with a first QoS bearer and an alternate VPN tunnel associated with a second QoS bearer;

access a VPN policy which specifies at least two different QoS levels to be applied to transport packets in accordance with at least one characteristic of the application data contained therein, the VPN policy specified independently of a transport network policy established for the transport network which also specifies at least two different QoS levels to be applied to transport packets;

receive a first data block of a plurality of data blocks specifying application messages generated by at least two software applications, each said data block comprising application data;

analyze said first data block to determine at least one said characteristic of the application data contained therein;

apply the VPN policy to said first data block whereby said default VPN tunnel or said alternate VPN tunnel is assigned to the first data block based on the characteristic of the application data in accordance with the VPN policy;

selectively assign a VPN tunnel indicator to the first data block that defines a QoS in the transport network which is different from the QoS which would be assigned to a transport packet including the first data block by the transport network in the presence of encryption;

encrypting said first data block to generate a VPN payload;

encapsulate said VPN payload with a transport packet header to form a transport packet, said transport packet header including at least one VPN tunnel indicator which specifies which one of the default VPN tunnel and the alternate tunnel was previously assigned to the first data block; and communicate said transport packet to the transport network where a QoS policy is applied to assign the transport packet to the first QoS bearer or the second QoS bearer based on the VPN tunnel indicator contained in the transport packet header;

wherein the transport packet is communicated across the transport network using one of the first or second QoS bearer as determined in accordance with the VPN policy, independently of the transport network policy for said application data having said characteristic.

12. The system according to claim 11, wherein said at least one electronic circuit further encrypts said first data block using a cryptographic key and a cryptographic protocol prior to said encapsulation.

13. The system according to claim 11, wherein said at least one characteristic of said first data block comprises an application identifier, an application type, or an application protocol.

14. The system according to claim 11, wherein said VPN tunnel indicator comprises a port number.

15. The system according to claim 11, wherein said first VPN endpoint comprises a VPN client in a remote host computing device that includes said at least one electronic circuit, and said application data is received from a software application executing in said remote host computing device.

16. The system according to claim 11, wherein said first VPN endpoint comprises a VPN server that includes said at least one electronic circuit, said second VPN endpoint comprises a VPN client, and said application data is received from an application server in communication with said VPN server via a private computer network.

17. The system according to claim 16, wherein said at least one characteristic comprises a destination address associated with said VPN client, and said at least one electronic circuit further selects said VPN policy based on said destination address.

18. The system according to claim 11, wherein said at least one electronic circuit is further configured to:

receive a transport data block from said second VPN endpoint, said transport data block comprising a VPN payload and at least one indicator specifying one of said default VPN tunnel and said alternate VPN tunnel;

analyze said transport data block to determine said indicator;

select at least one of a cryptographic key and a cryptographic protocol based on said indicator; and decrypt said VPN payload using a cryptographic key and a cryptographic protocol in accordance with said selection.

* * * * *